(12) United States Patent
Seo et al.

(10) Patent No.: US 9,697,179 B2
(45) Date of Patent: Jul. 4, 2017

(54) METHOD AND APPARATUS FOR INSERTING IMAGE INTO ELECTRONIC DOCUMENT

(75) Inventors: Gi-won Seo, Seoul (KR); Hyung-jong Kang, Seoul (KR); Jeong-hun Kim, Hwaseong-si (KR); In-chang Park, Seoul (KR); Mi-sook Song, Suwon-si (KR); Hee-chul Jung, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 808 days.

(21) Appl. No.: 13/588,512

(22) Filed: Aug. 17, 2012

(65) Prior Publication Data
US 2013/0055069 A1 Feb. 28, 2013

(30) Foreign Application Priority Data
Aug. 26, 2011 (KR) .................. 10-2011-0085817

(51) Int. Cl.
*G06F 17/21* (2006.01)
*H04N 1/00* (2006.01)
*H04N 1/32* (2006.01)
*G06F 17/24* (2006.01)
(Continued)

(52) U.S. Cl.
CPC .......... *G06F 17/211* (2013.01); *G06F 17/248* (2013.01); *G06F 17/30893* (2013.01); *H04N 1/0023* (2013.01); *H04N 1/00225* (2013.01); *H04N 1/32128* (2013.01); *H04N 1/3875* (2013.01); *H04N 2201/0094* (2013.01); *H04N 2201/3225* (2013.01); *H04N 2201/3226* (2013.01); *H04N 2201/3278* (2013.01)

(58) Field of Classification Search
CPC ......... G06F 17/30244; G06F 17/30247; G06F 17/248; G06F 17/30256; G06F 17/30268; G06F 17/30277; G06F 17/30696; G06F 17/30905; G06F 17/211; G06F 17/30893
See application file for complete search history.

(56) References Cited

U.S. PATENT DOCUMENTS 5,892,843 A * 4/1999 Zhou ................. G06K 9/00442
358/462
6,898,317 B2  5/2005 Struble et al.
8,271,474 B2 * 9/2012 Walker et al. ................ 707/708
(Continued)

FOREIGN PATENT DOCUMENTS

KR        10-0191262       6/1999
KR     10-2011-0005549     1/2011

OTHER PUBLICATIONS

Korean Office Action dated Apr. 20, 2017 in corresponding Korean Patent Application No. 10-2011-0085817 (7 pages) (6 pages English Translation).

*Primary Examiner* — Wilson Tsui
(74) *Attorney, Agent, or Firm* — Staas & Halsey LLP

(57) ABSTRACT

A method of inserting an image into an electronic document, the method including receiving setting information and identification information regarding the image; determining whether the image included in image data corresponds to the identification information by using a result of analysis of the image data; and according to a result of the determination, inserting the image corresponding to the identification information into a position of the electronic document, according to the setting information.

20 Claims, 15 Drawing Sheets

(51) Int. Cl.
*G06F 17/30* (2006.01)
*H04N 1/387* (2006.01)

(56) References Cited

U.S. PATENT DOCUMENTS

| | | | |
|---|---|---|---|
| 2003/0160824 A1* | 8/2003 | Szumla | 345/769 |
| 2004/0076342 A1* | 4/2004 | Wolff | G06T 11/60 382/294 |
| 2005/0206747 A1* | 9/2005 | Shirakawa | G11B 27/036 348/231.6 |
| 2007/0100648 A1* | 5/2007 | Borquez et al. | 705/1 |
| 2007/0101251 A1* | 5/2007 | Lee et al. | 715/501.1 |
| 2008/0117448 A1* | 5/2008 | Ijams | G06T 11/60 358/1.15 |
| 2008/0205798 A1* | 8/2008 | Bickley | 383/11 |
| 2008/0215964 A1* | 9/2008 | Abrams et al. | 715/246 |
| 2011/0025883 A1* | 2/2011 | Shkurko et al. | 348/231.2 |
| 2011/0125735 A1* | 5/2011 | Petrou | 707/723 |
| 2012/0177297 A1* | 7/2012 | Everingham | G06K 9/325 382/229 |
| 2012/0294514 A1* | 11/2012 | Saunders et al. | 382/159 |
| 2012/0324341 A1* | 12/2012 | Dejean | G06F 17/211 715/243 |

* cited by examiner

METHOD AND APPARATUS FOR INSERTING IMAGE INTO ELECTRONIC DOCUMENT

CROSS-REFERENCE TO RELATED APPLICATIONS

This application claims the priority benefit of Korean Patent Application No. 10-2011-0085817, filed on Aug. 26, 2011, in the Korean Intellectual Property Office, the disclosure of which is incorporated herein in its entirety by reference.

BACKGROUND

1. Field

Example embodiments of the following disclosure relate to a method and apparatus for inserting an image into an electronic document, and more particularly, to a method and apparatus in which a user may easily insert an image into an electronic document through simple manipulation and may change an image that is previously inserted into the electronic document.

2. Description of the Related Art

Image forming apparatuses, such as, printers, scanners, multi-function peripherals, or the like may perform at least one function selected from a group of functions consisting of printing of data to be printed, scanning of documents, copying of documents, sending/receiving of data to be transmitted through facsimile, sending/receiving of e-mails, and the like. In an image forming apparatus, scan data generated by scanning a document is transmitted to a host device connected to the image forming apparatus. The host device may insert images included in the scan data into an electronic document by using the scan data.

SUMMARY

Additional aspects and/or advantages will be set forth in part in the description which follows and, in part, will be apparent from the description, or may be learned by practice of the invention.

According to an aspect of the present disclosure, provided is a method and apparatus for inserting an image into an electronic document and having improved user convenience.

Another aspect of the present disclosure provides a non-transitory computer readable recording medium having embodied thereon a computer program for executing the method.

According to an aspect of the present disclosure, there is provided a method of inserting an image into an electronic document, the method including: receiving setting information for designating a position where an image is to be inserted into an electronic document and identification information regarding the image; determining whether the image included in image data corresponds to the identification information by using a result of analysis of the image data; and according to a result of the determination, inserting the image corresponding to the identification information into a position of the electronic document according to the setting information.

According to another aspect of the present disclosure, there is provided a method of inserting an image into an electronic document in a host device, the method including: receiving selection information for selecting a first button for performing a function of setting the setting information for designating a position where an image is to be inserted into the electronic document and a size of the image to be inserted and identification information regarding the image; generating a frame for designating the setting information; receiving identification information regarding an image to be inserted into the generated frame; receiving selection information for selecting a second button for performing a function of inserting an image corresponding to the identification information into the electronic document according to the setting information; if the selection information for selecting the second button is received, controlling an image forming apparatus connected to the host device so as to perform a scanning operation; receiving scan data from the image forming apparatus according to a result of the scanning operation; and according to a result of analysis of the scan data, if an image included in the scan data corresponds to the identification information, inserting the image corresponding to the identification information into the electronic document according to the setting information.

According to another aspect of the present disclosure, there is provided a non-transitory computer readable recording medium having embodied thereon a computer program for executing the method.

According to another aspect of the present disclosure, there is provided an image inserting apparatus for inserting an image into an electronic document, the image inserting apparatus including: a user interface unit for receiving setting information for designating a position where an image is to be inserted into an electronic document and identification information regarding the image; a determination unit for determining whether the image included in image data corresponds to the identification information by using a result of analysis of the image data; and an insertion unit for inserting the image corresponding to the identification information into a position of the electronic document according to the setting information.

BRIEF DESCRIPTION OF THE DRAWINGS

The above and other features and advantages of the present disclosure will become more apparent by describing in detail exemplary embodiments thereof with reference to the attached drawings in which:

FIG. 5A illustrates texts included in image data, according to an example embodiment of;

DETAILED DESCRIPTION

The present disclosure will now be described more fully with reference to the accompanying drawings, in which exemplary embodiments of the present disclosure are shown. Expressions such as "at least one of," when preceding a list of elements, modify the entire list of elements and do not modify the individual elements of the list.

Figure 1:
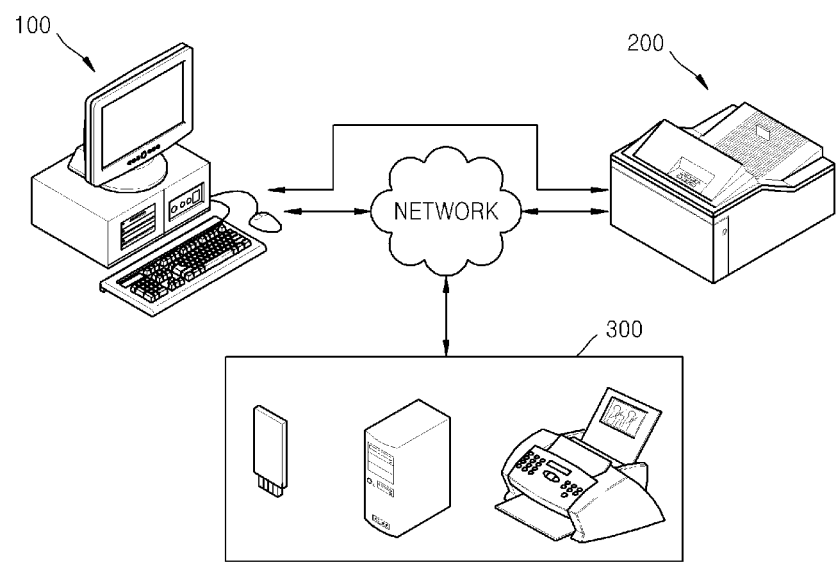
FIG. 1 illustrates a usage environment of a host device and an image forming apparatus, according to an example embodiment.

FIG. 1 illustrates a usage environment of a host device 100 and an image forming apparatus 200, according to an example embodiment.

Referring to FIG. 1, the host device 100 may be connected to the image forming apparatus 200 and an external device 300. For convenience of description, FIG. 1 illustrates one host device 100, one image forming apparatus 200, and one external device 300, but the present disclosure is not limited thereto. That is, a plurality of the host devices 100 may be connected to a plurality of the image forming apparatuses 200 and a plurality of the external devices 300.

The host device 100, the image forming apparatus 200, and the external device 300 of the current embodiment may send/receive data with one another via a wire/wireless network or wire serial communication by using a communication module included in each of the host device 100, the image forming apparatus 200, and the external device 300. In this regard, a network may include Internet, a local area network (LAN), a wireless LAN, a wide area network (WAN), a personal area network (PAN), and the like. However, the present disclosure is not limited thereto, and any other network through which information may be sent/received may be used.

The host device 100 may be a device for controlling the image forming apparatus 200, and may include all devices capable of controlling the image forming apparatus 200 by being connected to the image forming apparatus 200, such as, a general-purpose computer system, a personal digital assistant (PDA), or the like. In addition, the host device 100 may further include an apparatus for inserting an image into an electronic document, which will be described in detail with reference to FIGS. 2 and 3.

The image forming apparatus 200 may be an apparatus for forming an image and may include printers, scanners, multifunction peripherals (MFPs), and the like. Thus, the image forming apparatus 200 may perform printing, scanning, copying, sending/receiving via facsimile, sending of an e-mail, transmitting of a file to a server, and the like. However, the present disclosure is not limited thereto, and the image forming apparatus 200 may also perform various other operations.

The external device 300 may be any device connected to the host device 100 and the image forming apparatus 200 via a wire/wireless network or wire serial communication. For example, the external device 300 may include not only a universal serial bus (USB) memory and a facsimile sending/receiving apparatus, but also a general-purpose computer system existing on a network, a server device, a digital living network alliance (DLNA) device, a web server, and the like.

Thus, the host device 100 may insert an image included in image data received from at least one of the image forming apparatus 200 and the external device 300 into an electronic document through simple manipulation.

Figure 2:
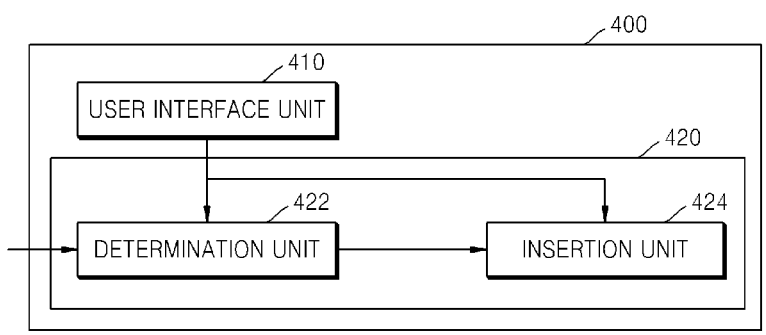
FIG. 2 is a block diagram of an image inserting apparatus for inserting an image into an electronic document, according to an example embodiment.

FIG. 2 is a block diagram of an image inserting apparatus 400 for inserting an image into an electronic document, according to an example embodiment of the present disclosure. Referring to FIG. 2, the image inserting apparatus 400 may include a user interface unit 410 and a processor 420. The processor 420 may include a determination unit 422 and an insertion unit 424. The image inserting apparatus 400 of FIG. 2 may be included in the host device 100, illustrated in FIG. 1. However, the present disclosure is not limited thereto, and the image inserting apparatus 400 may be included in the image forming apparatus 200.

In FIG. 2, the image inserting apparatus 400 may include components related to the current embodiment. Accordingly, the image inserting apparatus 400 may also include other general-purpose components.

The user interface unit 410 may receive setting information for designating a position where an image is to be inserted into an electronic document and identification information regarding the image. The user interface unit 410 of the current embodiment may obtain input information from a user and may display output information to the user. For example, the user interface unit 410 may include input/output devices, such as, a display panel, a mouse, a keyboard, a touch screen, a monitor, a speaker, etc., and a software module for driving the above-stated input/output devices.

As such, the setting information and the identification information received through the user interface unit 410 may be stored in a memory (not shown) of the image inserting apparatus 400, and the processor 420 may perform a function of inserting an image into an electronic document with reference to the information stored in the memory.

The processor 420 may determine whether an image included in image data corresponds to the identification information by using a result of analysis of the image data, and may perform a function of inserting the image into a position of the electronic document, according to the setting information, based on a result of the determination. In this regard, the processor 420 may automatically perform the above-described function.

The determination unit 422 and the insertion unit 424 included in the processor 420 may each be a software module or a hardware module included in the processor 420.

The image data of the current embodiment may be image data scanned in the image forming apparatus 200 connected to the image inserting apparatus 400. However, the present disclosure is not limited thereto, and the image data may be image data received from the external device 300 connected to the image inserting apparatus 400.

The determination unit 422 may determine whether an image included in image data corresponds to identification information by using a result of analysis of the image data. In this regard, the image included in the image data may include all objects represented by an image, a picture, or the like, other than a text from among various objects included in the image data.

The determination unit 422 may determine whether a text included in the image data and an attribute of an image included in the image data correspond to the identification information received through the user interface unit 410.

In this regard, the determination unit 422 may determine whether extracted text or recognized attribute of the image corresponds to the identification information by using a pattern matching algorithm. For example, the determination unit 422 may determine whether the extracted text corresponds to the identification information by using a Boyer-Moore algorithm or a Knuth-Morris-Pratt algorithm. However, the present disclosure is not limited thereto, and the determination unit 422 may determine whether the extracted text corresponds to the identification information by using various algorithms performing an operation for matching the text.

The insertion unit 424 may insert an image corresponding to the identification information into a position of the electronic document, according to the setting information, based on a result of the determination of the determination unit 422. Thus, the insertion unit 424 may be an image mapper.

The electronic document, according to the current embodiment may include at least one of an electronic document, which is being executed and a stored electronic document. When the image inserting apparatus 400 is included in the host device 100 illustrated in FIG. 1, the electronic document may be at least one of an electronic document which is being executed in the host device 100 and an electronic document stored in the host device 100. In this regard, the electronic document, which is being executed in the host device 100 may be an electronic document that is being edited using any of various application programs, such as, Microsoft Office Word, Microsoft Office Excel, Microsoft Office PowerPoint, a portable document format (PDF), Hangul, Humminjungum, or the like.

In addition, the electronic document, according to the current embodiment may be an electronic document written in a binary file format, such as, doc or xls, an electronic document, based on an open document format (ODF) or an eXtensible Markup Language (XML), such as, an office open XML (OOXML), or the like. However, the present disclosure is not limited thereto, and the electronic document, according to the current embodiment, may include a hyper text markup language (HTML)-based web page. A method of inserting an image into an HTML-based web page by the image inserting apparatus 400 will be described with reference to FIG. 12.

As such, the image inserting apparatus 400 may automatically perform a function of inserting an image into an electronic document by receiving setting information and identification information, receiving image data by a user's simple manipulation, analyzing the image data to determine whether an image included in the image data corresponds to the identification information, and inserting the image corresponding to the identification information into a position of the electronic document, according to the setting information based on a result of the determination. Thus, a user may easily insert the image into the electronic document by using the image inserting apparatus 400.

Further, for convenience of description, a case where one image is inserted into one electronic document has been described. However, the present disclosure is not limited thereto, and the image inserting apparatus 400 may be used in a case where a plurality of images are inserted into a plurality of electronic documents, which will be described later with reference to FIG. 10.

Figure 3:
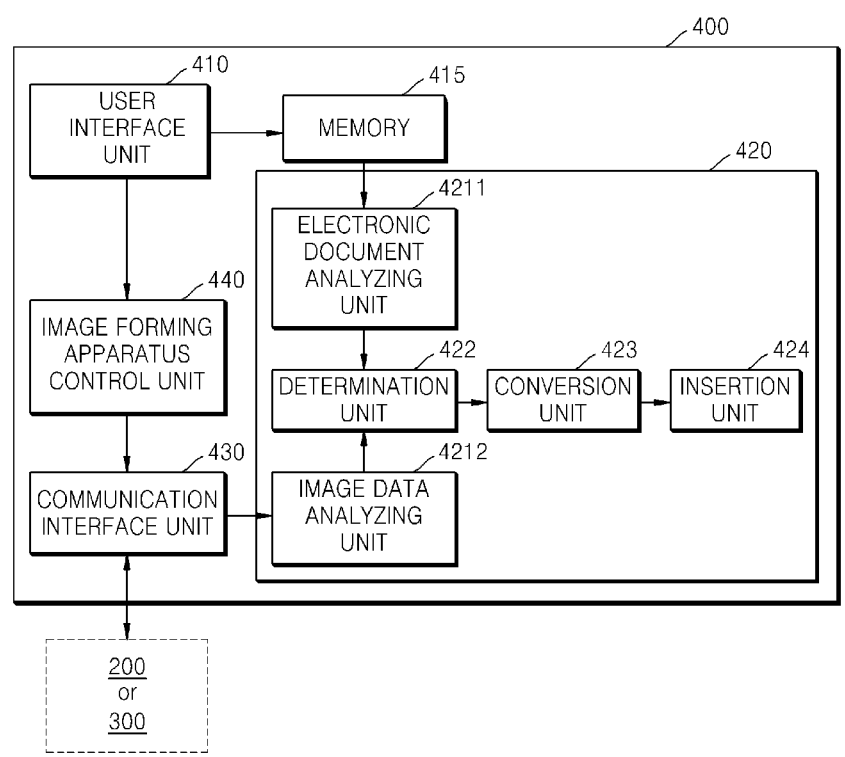
FIG. 3 is a block diagram of an image inserting apparatus for inserting an image into an electronic document, according to another example embodiment.

FIG. 3 illustrates a block diagram of an image inserting apparatus 400 for inserting an image into an electronic document, according to another example embodiment of the present disclosure. Referring to FIG. 3, the image inserting apparatus 400 may include a user interface unit 410, a memory 415, a processor 420, a communication interface unit 430, and an image forming apparatus control unit 440. The processor 420 may include an electronic document analyzing unit 4211, an image data analyzing unit 4212, a determination unit 422, a conversion unit 423, and an insertion unit 424. The image inserting apparatus 400 illustrated in FIG. 3 may be included in the host device 100, illustrated in FIG. 1. However, the present disclosure is not limited thereto, and the image inserting apparatus 400 may be included in the image forming apparatus 200, for example.

In FIG. 3, the image inserting apparatus 400 includes components related to the current embodiment. Accordingly, the image inserting apparatus 400 may also include other general-purpose components.

Additionally, the image inserting apparatus 400, illustrated in FIG. 3, may correspond to an example embodiment of the image inserting apparatus 400, illustrated in FIG. 2. Thus, the image inserting apparatus 400, according to the current embodiment is not limited to units illustrated in FIG. 3. The description with regard to FIGS. 1 and 2 may also be used in the image inserting apparatus 400 illustrated in FIG. 3, and thus a repeated description thereof will be omitted.

A user interface unit 410 may receive setting information for designating a position where an image is to be inserted into an electronic document and a size of the image to be inserted into the electronic document, and identification information regarding the image. In this regard, a user may input metadata by using the user interface unit 410, so as to input the identification information.

The setting information, according to the current embodiment, may be defined in the form of a frame corresponding to an image. For example, if a user designates an area corresponding to a position where the image is to be inserted and to a size of the image to be inserted as a frame by using the user interface unit 410, the user interface unit 410 may be receive the position and the size, according to the area corresponding to the designated frame, as the setting information.

A user may use a mouse, a cursor, or the like, which are examples of the user interface unit 410, in order to designate the frame, and may designate the frame in a predetermined area of an electronic document, for example, by dragging a mouse.

Further, the identification information, according to the current embodiment, is information representing an image and may include information for distinguishing each of a plurality of images. For example, the identification information may include at least any one selected from the group consisting of a title, a creator, a type, a description, a subject, a key work, and an index of an image.

In this regard, the identification information may be defined in a metadata format or in a predetermined data format. For example, the identification information may be a set of data for defining an image. Thus, a user may input the identification information in a metadata format or in a predetermined data format by using the user interface unit 410. Hereinafter, a method of inputting identification information will be described.

A user may input the identification information in a format, for example, metadata, by using the user interface unit 410. For example, the user may input the identification information by using international organization for standardization (ISO), such as, Dublin Core.

Moreover, a user may input the identification information in a predetermined data format by using the user interface unit 410. For example, the user may input the identification information in a format of 'Scan_Image=XXX'. In this regard, the 'XXX' may be at least any one selected from the group consisting of an attribute, a title, a creator, a type, a description, a subject, a key word, and an index of an image, however, the group is not limited thereto.

In a case of an XML-based electronic document, a user may directly input metadata including setting information and identification information in the electronic document by using the user interface unit 410.

When the electronic document is written in an ODF format, a user may input identification information in a text:meta or text:meta-field tag, according to an xhtml:about or xhtml:content format, by using a W2C Resource Description Framework. For example, the setting information may be defined as Frame 1 in the electronic document, and the identification information regarding Samsung GalaxyS II may be defined as shown below. In this regard, the 'Samsung GalaxyS II' may be an attribute, a title, a description, a subject, a key word, or an index of an image.

<text:p>Frame 1
<text:meta xhtml:about="Scan Image Frame" xhtml:
    context="Samsung GalaxyS II">
</text:meta>

When an electronic document is written in an OOXML format, a user may input identification information by using <smartTag>, <sdt>, or <customxml>, or the like. For example, when the user inputs identification information by using <smartTag>, the identification information regarding Samsung GalaxyS II may be defined as shown below. In this regard, the 'Samsung GalaxyS II' may be an attribute, a title, a description, a subject, a key word, or an index of an image.
<w:smartTag w:element="Scan Image Frame">
<w:smartTagPr>
<w:attr w:name="MappingContent: w:val="Samsung GalaxyS II">
</w:smartTagPr>
<w:smarTag>

In addition, when an electronic document is an HTML-based web page, a user may input identification information by using a text described in alt from among attributes values of an <img> tag or by using metadata of a <meta> tag. Example embodiments of the identification information will now be described in detail with reference to FIG. 4.

The memory 415 stores the setting information and the identification information received through the user interface unit 410. In this regard, the memory 415 stores information regarding the electronic document, together with the setting information and the identification information. Thus, the processor 420 may use the setting information and the identification information that are set with respect to each of a plurality of electronic documents.

The memory 415, which is a general storage medium, may include a hard disk drive (HDD), a read only memory (ROM), a random access memory (RAM), a flash memory, a memory card, and a solid state drive (SSD). However, the present disclosure is not limited to these example general storage media.

The processor 420 performs a function of inserting an image into an electronic document.

The electronic document analyzing unit 4211 analyzes an electronic document so as to extract setting information and identification information included in the electronic document. In other words, the electronic document analyzing unit 4211 extracts setting information and identification information included in the electronic document by analyzing an electronic document.

For example, the electronic document analyzing unit 4211 may be a document parser. Thus, the electronic document analyzing unit 4211 may analyzes an electronic document, which is being executed in the host device 100, including the image inserting apparatus 400 and an electronic document stored in the host device 100, including the image inserting apparatus 400 so as to extract setting information and identification information included in the electronic document.

The identification information, according to the current embodiment, is defined in a metadata format or in a predetermined data format, and thus, the electronic document analyzing unit 4211 may easily extract the identification information from the electronic document.

The image data analyzing unit 4212 may analyze image data so as to extract a text included in the image data or to recognize an attribute of an image included in the image data. In other words, the image data analyzing unit 4212 may extract a text included in the image data or recognize an attribute of an image included in the image data by analyzing image data.

In this regard, when a plurality of images are included in the image data, the image data analyzing unit 4212 may extract a text with respect to each image or recognize an attribute of each image.

The image data may be scan data of image data that is scanned in the image forming apparatus 200 connected to the image inserting apparatus 400 and is received through the communication interface unit 430. Alternatively, the image data may be data received through the communication interface unit 430 from the external device 300 connected to the image inserting apparatus 400. For example, the image data may be facsimile data received via facsimile, which is an example of the external device 300.

In detail, the image data analyzing unit 4212, according to the current embodiment may use an optical character reader (OCR) method, a pattern recognition method, or the like, in order to analyze image data.

Thus, the image data analyzing unit 4212 may extract a text included in image data by using an OCR method or a pattern recognition method. The text included in the image data may be a text disposed at an edge, such as, an upper or lower end of an image included in the image data, but the present disclosure is not limited thereto. The text included in the image data will be described in detail with reference to FIG. 5A.

In addition, the image data analyzing unit 4212, according to the current embodiment, may recognize an attribute of the image included in the image data by using the OCR method or the pattern recognition method, and may determine whether the recognized attribute of the image corresponds to the identification information received through the user interface unit 410.

The attribute of the image included in the image data may be a definition of an image included in image data, but the present disclosure is not limited thereto. In a case where the image data includes an image representing a scanner, an attribute of the image included in the image data may be a scanner. The attribute of the image included in the image data will be described in detail with reference to FIG. 5B.

The determination unit 422 may determine whether the image included in the image data corresponds to identification information by using a result of the analysis of the image data. In this regard, when a plurality of images are included in the image data, the determination unit 422 may determine whether each image corresponds to the identification information.

The conversion unit 423 may convert a size of an image corresponding to identification information into a size, according to setting information, based on a result of the determination of the determination unit 422. For example, if the determination unit 422 determines that the image included in image data corresponds to identification information, the conversion unit 423 may convert the size of the image into a size, according to the setting information. When a user inputs a size of an image to be inserted as setting information by designating a frame, the conversion unit 423 may convert the size of the image into a size of the designated frame.

The insertion unit 424 may insert the converted image into a position, according to the setting information of an electronic document. Thus, the user may insert the image into the electronic document without performing an additional editing operation.

The communication interface unit 430 is connected to the image forming apparatus 200 and the external device 300, so as to receive image data. For example, the communication interface unit 430 may receive scan data scanned in the image forming apparatus 200 or facsimile data received via facsimile, which is an example of the external device 300.

The image forming apparatus control unit 440 controls the image forming apparatus 200. For example, the image forming apparatus control unit 440 may control the image forming apparatus 200 so as to perform printing and scanning operations with reference to information input by a user.

Thus, if setting information and identification information are received through the user interface unit 410 and image data is received from the image forming apparatus 200 and the external device 300 through the communication interface unit 430, the processor 420 may automatically insert an image included in image data into an electronic document. Thus, a user may easily insert the image into the electronic document through simple manipulation by using the image inserting apparatus 400, according to the current embodiment, without performing an inconvenient operation, such as, storing and editing operations of image data obtained by scanning the image.

Figure 4:
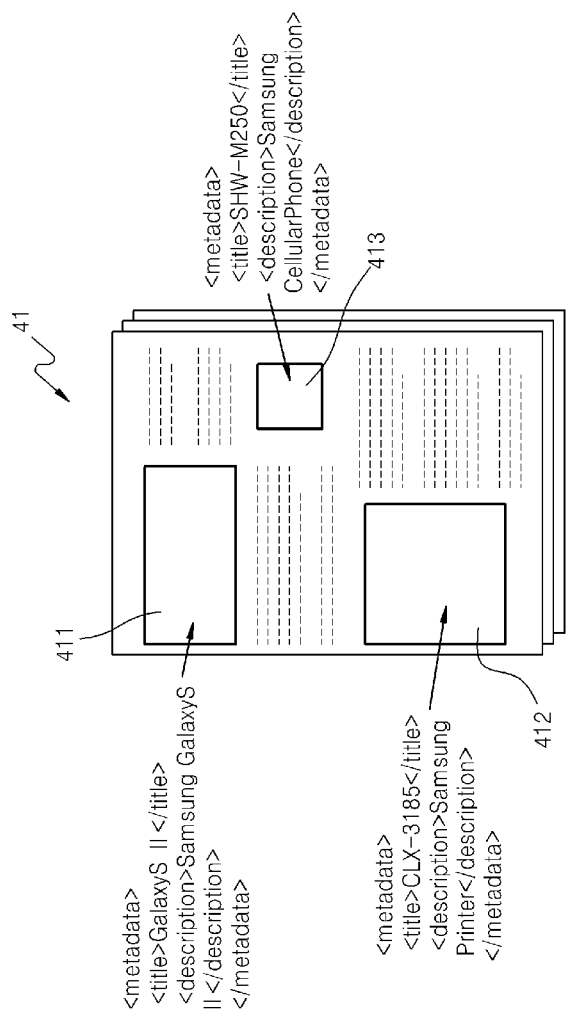
FIG. 4 is an illustration for describing setting information and identification information, according to an example embodiment.

FIG. 4 illustrate a view for describing setting information and identification information, according to an example embodiment of the present disclosure. Referring to FIG. 4, an electronic document 41 includes first information 411 regarding a first image, second information 412 regarding a second image, and third information 413 regarding a third image.

The first information 411 regarding the first image includes setting information for setting a position where the first image is to be inserted and a size of the first image to be inserted and identification information regarding the first image. The second information 412 regarding the second image includes setting information for setting a position where the second image is to be inserted and a size of the second image to be inserted and identification information regarding the second image. The third information 413 regarding the third image includes setting information for setting a position where the third image is to be inserted and a size of the third image to be inserted and identification information regarding the third image. In this regard, the setting information may be a frame designated in the form of a box, and the identification information may be metadata defined as <metadata> . . . </metadata>.

Hereinafter, the image inserting apparatus 400, illustrated in FIGS. 2 and 3, will be described in detail. A user may input the first information 411, the second information 412, and the third information 413 by using the user interface unit 410.

As a non-limiting example, in the first information 411, a title of the first image is 'GalaxyS II', and a description of the first image is 'Samsung GalaxyS II'. That is, the user designates a frame according to a position where the first image is to be inserted and a size of the first image to be inserted and inputs metadata including the title and the description of the first image by using the user interface unit 410. Thus, the user may input the second information 412 and the third information 413 in the same manner as the first information 411.

As such, the user may easily set setting information and identification information by using the user interface unit 410.

Figure 5A:
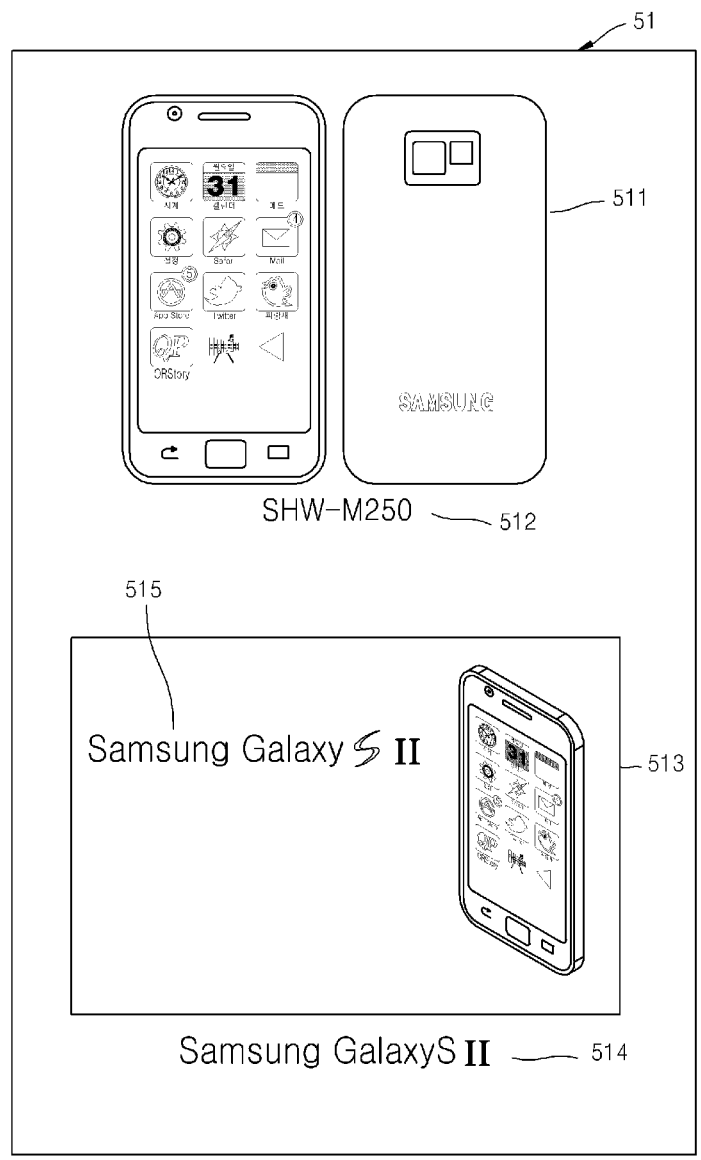

FIG. 5A is a view illustrating texts included in image data 51, according to an example embodiment of the present disclosure. Referring to FIG. 5A, the image data 51 may be scan data obtained scanning a document including images and texts.

The image data 51 includes a first image 511, a first text 512, a second image 513, a twenty-first text 514, and a twenty-second text 515.

Hereinafter, the image inserting apparatus 400, illustrated in FIGS. 2 and 3, will be described in detail. The image data analyzing unit 4212, according to the current embodiment, extracts texts included in the image data 51 by using an OCR method or a pattern recognition method, and the determination unit 422 determines whether the extracted texts correspond to identification information inputted through the user interface unit 410.

Thus, the image data analyzing unit 4212 may extract the first text 512 and the twenty-first text 514 included in the image data 51 by using the OCR method or the pattern recognition method. In addition, the image data analyzing unit 4212 may extract the twenty-second text 515 included in the second image 513, according to a usage environment.

The texts included in the image data according to the current embodiment may be texts disposed at an edge such as an upper or lower end of an image included in the image data, however, the present disclosure is not limited thereto. Additionally, as illustrated in FIG. 5A, when the image data 51 includes a plurality of images and a plurality of texts, the text corresponding to each image included in the image data 51 may be a text disposed at an edge, such as, an upper or lower end of each image included in the image data 51.

Further, the image data analyzing unit 4212 compares distances between an image and texts and determines a text closer to the image as a text corresponding to the image so as to extract the text. That is, when a plurality of the texts are included in image data, the text corresponding to the image may be text that is closest to the image included in the image data. In this regard, directions close to the image may include above and below the image and all arbitrary directions of the image.

However, the present disclosure is not limited thereto, and the image data analyzing unit 4212 may determine all texts existing below a distance, which is previously designated by a user, from an image as a text corresponding to the image so as to extract the text.

For example, the first image 511 is closest to the first text 512 from among the first text 512, the twenty-first text 514, and the twenty-second text 515. Thus, the image data analyzing unit 4212 extracts the first text 512 as a text corresponding to the first image 511.

Alternatively, the second image 513 is closest to the twenty-first text 514 from among the first text 512, the twenty-first text 514, and the twenty-second text 515. Thus, the image data analyzing unit 4212 extracts the twenty-first text 514 as a text corresponding to the second image 513. Alternatively, the determination unit 422 may extract the twenty-second text 515 overlapping with the second image 513 as a text corresponding to the second image 513.

However, the image data analyzing unit 4212 may extract all of the twenty-first text 514 and the twenty-second text 515 existing below a distance, which is previously designated by a user, from an image as a text corresponding to the second image 513, according to a usage environment.

Thus, the image data analyzing unit 4212 may extract the first text 512, that is, 'SHW-M250', corresponding to the first image 511 and the twenty-first text 514, that is, 'Samsung GalaxyS II', corresponding to the second image 513 by analyzing the image data 51, and the determination unit 422 may determine whether the extracted first and twenty-first texts 512 and 514 correspond to identification information set in an identification information.

Figure 5B:
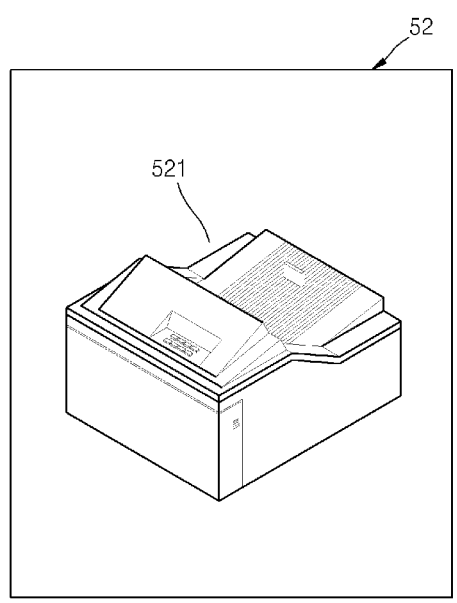
FIG. 5B illustrates an image included in image data, according to an example embodiment.

FIG. 5B is a view illustrating an image 521 included in image data 52, according to an example embodiment of the present disclosure.

Hereinafter, the image inserting apparatus 400, illustrated in FIGS. 2 and 3, will be described in detail. The image data analyzing unit 4212, according to the current embodiment, recognizes an attribute of an image included in image data by using an OCR method or a pattern recognition method, and the determination unit 422 determines whether the recognized attribute of the image corresponds to identification information inputted through the user interface unit 410.

Thus, the image data analyzing unit 4212 may recognize an attribute of the image 521 included in the image data 52 as a 'copier', a 'scanner', or the like, by using the OCR method or the pattern recognition method. For example, the image data analyzing unit 4212 may recognize the attribute of the image 521 by using a shape of the image 521.

Thus, the image data analyzing unit 4212 may recognize the attribute of the image 521 included in the image data 52 as a 'copier', a 'scanner', or the like, by analyzing the image data 52, and the determination unit 422 may determine whether the attribute of the image 521 corresponds to identification information set in an electronic document.

Figure 6:
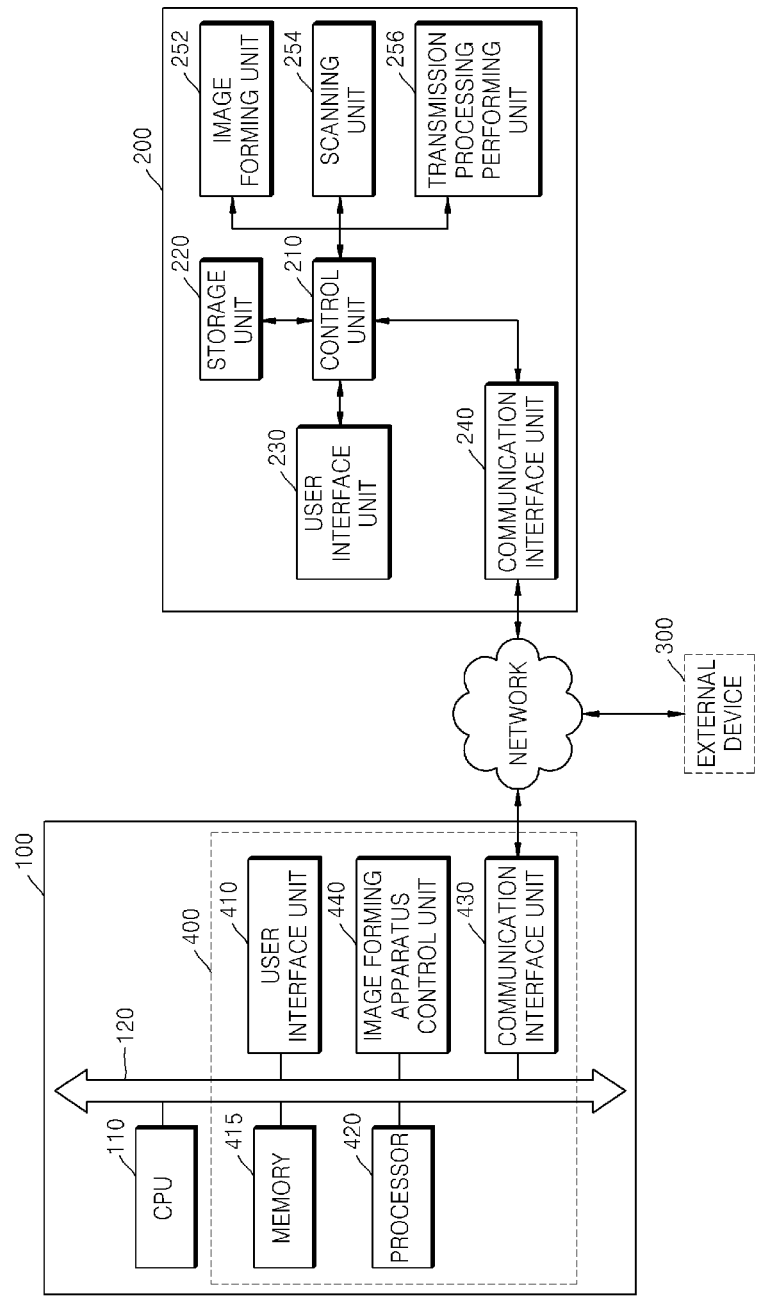
FIG. 6 illustrates block diagrams of a host device and image forming apparatus, according to an example embodiment.

FIG. 6 illustrates block diagrams of a host device 100 and an image forming apparatus 200, according to an example embodiment of the present disclosure. Referring to FIG. 6, the host device 100, according to the current embodiment, may include a central processing unit (CPU) 110, a system bus 120, and an image inserting apparatus 400. The image inserting apparatus 400 may include a user interface unit 410, a memory 415, a processor 420, a communication interface unit 430, and an image forming apparatus control unit 440. Further, the image forming apparatus 200 includes a control unit 210, a storage unit 220, a user interface unit 230, a communication interface unit 240, an image forming unit 252, a scanning unit 254, and a transmission processing performing unit 256.

In FIG. 6, the host device 100 and the image forming apparatus 200 each includes components related to the current embodiment. Accordingly, the host device 100 and the image forming apparatus 200 each may also include other general-purpose components.

The host device 100 and the image forming apparatus 200 illustrated in FIG. 6 correspond to the host device 100 and the image forming apparatus 200 illustrated in FIGS. 1 to 3. Thus, the host device 100 and the image forming apparatus 200, according to the current embodiment, are not limited to units illustrated in FIG. 6. The description with regard to FIGS. 1 to 3 may also be used in the host device 100 and the image forming apparatus 200, illustrated in FIG. 6, and thus, a repeated description thereof will be omitted.

The host device 100 is a device for controlling the image forming apparatus 200, and may include all devices capable of controlling the image forming apparatus 200 by being connected to the image forming apparatus 200, such as, a general-purpose computer system, a PDA, or the like.

The CPU 110 may control the whole operation of the host device 100, and the system bus 120 may transmit information between elements included in the host device 100.

The image inserting apparatus 400 may receive setting information for designating a position where an image is to be inserted into an electronic document and a size of the image to be inserted and identification information regarding the image, determines whether an image included in image data corresponds to the identification information by using a result of analysis of the image data, converts a size of the image corresponding to the identification information into a size, according to the setting information, and inserts the converted image into a position of the electronic document, according to the setting information, based on a result of the determination.

The user interface unit 410 receives setting information for designating a position where an image is to be inserted into an electronic document and a size of the image to be inserted and identification information regarding the image. The user interface unit 410, according to the current embodiment, may include input/output devices, such as, a keyboard, a monitor, a mouse, and the like, and a software module for driving the above-stated input/output devices.

The user interface unit 410, according to the current embodiment, may display a first button for performing a function of setting the setting information and identification information and may receive selection information for selecting the first button.

In this regard, a user may generate a frame for designating setting information by using the user interface unit 410 and input identification information, regarding an image to be inserted into the generated frame. Thus, the user interface unit 410 may receive the setting information and the identification information.

In addition, the user interface unit 410, according to the current embodiment, may display a second button for performing a function of inserting an image corresponding to identification information into an electronic document, according to setting information, and may receive selection information for selecting the second button from a user.

In this regard, when the second button is selected, the image forming apparatus control unit 440 controls the image forming apparatus 200 so that the image forming apparatus 200 connected to the host device 100 performs a scanning operation through the communication interface unit 430. Thus, the communication interface unit 430 receives scan data according to a result of the scanning operation as image data from the image forming apparatus 200.

The memory 415 may store setting information and identification information input through the user interface unit 410. The processor 420 may determine whether an image included in image data corresponds to the identification information by using a result of analysis of the image data, may convert a size of the image corresponding to the identification information into a size according to the setting information, and may insert the converted image into a position of the electronic document, according to the setting information, based on a result of the determination. In this regard, if the image inserting apparatus 400 receives the image data, the processor 420 may automatically perform the above-described function.

The communication interface unit 430 may be connected to the image forming apparatus 200 and the external device 300 to receive image data, and the image forming apparatus control unit 440 controls the image forming apparatus 200 to perform a scanning operation.

The image forming apparatus 200 may perform at least one operation selected from the group consisting of scanning, printing, facsimile transmission, and e-mail transmission under the control of the host device 100.

The control unit 210 may control the whole function of the image forming apparatus 200. The storage unit 220 may store data necessary for operations of the image forming apparatus 200. The user interface unit 230 may receive input information from a user and displays output information. The communication interface unit 240 may send/receive data to/from the host device 100.

The image forming unit 252 may form an image and performs a printing operation for printing data to be printed on a printing paper. The image forming unit 252, according to the current embodiment, may include hardware units for performing charging, exposing, developing, transferring, and fixing for the printing operation and a software module for driving the hardware units.

The scanning unit 254 may perform a scanning operation for scanning a document to obtain image data. The scanning unit 254 may include hardware units for performing a scanning operation, such as, a light-emitting device, an image sensor, and a software module for driving the hardware units, and the like.

The transmission processing performing unit 256 may perform a transmission operation for transmitting data to be transmitted to the external device 300. The transmission processing performing unit 256 performs data processing for performing various transmission operations, for example, an e-mail transmission operation, a facsimile transmission operation, or the like, and the transmission processing performing unit 256 may also perform data processing to store the data in a server device.

Figure 7:
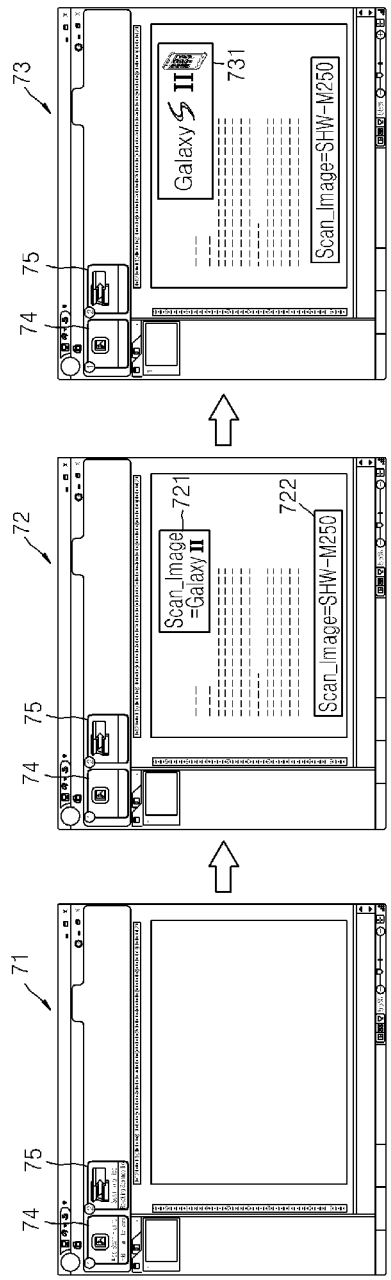
FIG. 7 is an illustration for describing a method of inserting an image into an electronic document, according to an example embodiment, wherein the method is implemented in the form of an application.

FIG. 7 is a view for describing a method of inserting an image into an electronic document, according to an embodiment, of the present disclosure, wherein the method may be implemented in the form of an application, such as, a plug-in application for various application programs.

In FIG. 7, for convenience of description, the method of inserting an image into an electronic document is implemented by a plug-in of a document editing program, but the present disclosure is not limited thereto. In this regard, the document editing program may be Microsoft Office Word, Microsoft Office Excel, Microsoft Office PowerPoint, or the like, but the present disclosure is not limited thereto.

In a first screen 71, a plug-in, in which a method of inserting an image into an electronic document is implemented is registered as a module of a document editing program. Referring to the first screen 71, as the plug-in is installed, a first button 74 and a second button 75 are generated in a toolbar of the document editing program.

The first button 74 may perform a function of setting the setting information for designating a position where an image is to be inserted into an electronic document and a size of the image to be inserted and identification information regarding the image, and the second button 75 may perform a function of inserting an image corresponding to the identification information into an electronic document, according to the setting information. For example, the second button 75 may perform functions of receiving image data, determining whether the image included in the image data corresponds to the identification information, converting a size of the image into a size, according to the setting information, and inserting the converted image into a position according to the setting information.

Referring to a second screen 72, a user may select the first button 74 by using, for example, a mouse, which is an example of the user interface unit 410, and then generate first and second frames 721 and 722 for designating setting information. In this regard, a user may generate the first and second frames 721 and 722, for example, by dragging a mouse. As such, as the user generates the first and second frames 721 and 722, the image inserting apparatus 400 may receive setting information through the user interface unit 410.

In this regard, the first and second frames 721 and 722 may include a background color, an outline color, and the like, that are previously determined. In an electronic document in which metadata may not be registered, the first and second frames 721 and 722 may include texts according to a data format that is previously defined. Thus, it may be easily recognized whether the electronic document includes a frame into which an image is to be inserted, and the frame may be easily distinguished from a general box or frame included in the electronic document.

In addition, a user may input identification information regarding images, which are to be respectively inserted into the generated first and second frames 721 and 722, in the first and second frames 721 and 722, respectively, by using, for example, a keyboard, which is an example of the user interface unit 410.

Hereinafter, a case where identification information is set in a data format that is previously defined will be described. A user may input 'Scan_Image=Galaxy II', which is information representing a name of an image to be inserted into the first frame 721 and input 'Scan_Image=SHW-M250', which is information representing a name of an image to be inserted into the second frame 722, by using, for example, a keyboard, which is an example of the user interface unit 410.

Referring to a third screen 73, if a user selects the second button 75 by using, for example, a mouse, which is an example of the user interface unit 410, the image inserting apparatus 400 receives image data, determines whether image included in the image data corresponds to identification information, converts a size of the image into a size according to setting information, and inserts the converted image into a position, according to the setting information.

Hereinafter, a case where the image inserting apparatus 400, according to the current embodiment, is included in the host device 100 connected to the image forming apparatus 200 will be described.

In this case, the first button 74 and the second button 75 may be displayed on the user interface unit 410, and a user may select the first button 74 and the second button 75 by using the user interface unit 410 and input setting information and identification information by using the user interface unit 410.

If the user selects the second button 75, the image forming apparatus control unit 440 controls the image forming apparatus 200 to perform a scanning operation, and the communication interface unit 430 receives scan data, according to the scanning operation as image data.

In addition, according to a result of analysis of the image data, if an image included in the image data corresponds to identification information, the processor 420 may insert the image into an electronic document, according to setting information. Referring to a third screen 73, a first image 731 may be inserted into the first frame 721 by using the method described above.

Thus, a user may insert an image into an electronic document only by performing simple manipulation for selecting the first and second buttons 74 and 75.

FIGS. 8 to 12 are flowcharts illustrating various methods of inserting an image into an electronic document. The flowcharts illustrated in FIGS. 8 to 12 include processes sequentially performed in the host device 100, the image forming apparatus 200, and the image inserting apparatus 400, illustrated in FIGS. 2, 3, and 6. Accordingly, although omitted below, the description with regard to the host device 100, the image forming apparatus 200, and the image inserting apparatus 400 illustrated in FIGS. 2, 3, and 6 may also be used in the flowcharts illustrated in FIGS. 8 to 12.

Figure 8:
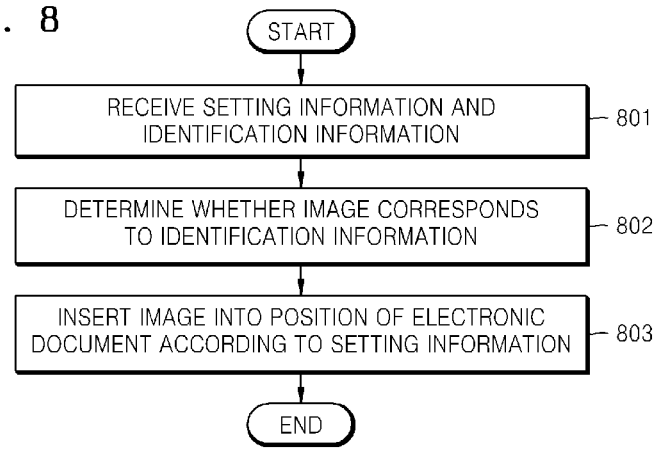
FIG. 8 is a flowchart of a method of inserting an image into an electronic document, according to an example embodiment.

FIG. 8 is a flowchart of a method of inserting an image into an electronic document according to an example embodiment of the present disclosure.

In operation 801, the user interface unit 410 may receive setting information for designating a position where an image is to be inserted into an electronic document and identification information regarding the image. In this regard, the setting information and the identification information may be inputted by a user, and the identification information may be defined in a metadata format or in a predetermined data format.

In operation 802, the determination unit 422 may determine whether an image included in image data corresponds to the identification information by analyzing the image data. For example, the determination unit 422 may determine whether a text included in image data or an attribute of an image included in image data corresponds to the identification information.

In operation 803, the insertion unit 424 may insert the image corresponding to the identification information according to a result of the determination of operation 802 into a position of an electronic document, according to the setting information.

In this regard, operations 802 and 803 may be automatically performed by the image inserting apparatus 400. Accordingly, a user may easily insert the image into the electronic document.

Figure 9:
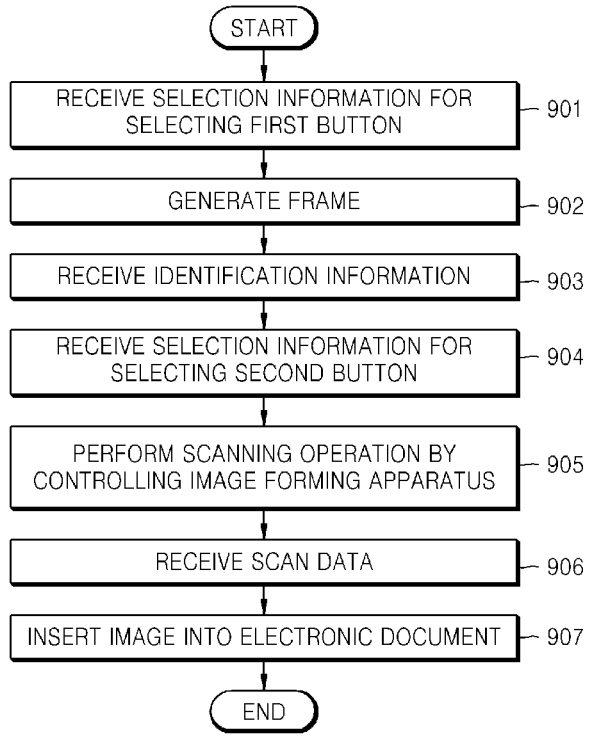
FIG. 9 is a flowchart of a method of inserting an image into an electronic document in a host device, according to an example embodiment.

FIG. 9 is a flowchart of a method of inserting an image into an electronic document in the host device 100, according to an example embodiment of the present disclosure.

In operation 901, the user interface unit 410 of the host device 100 receives selection information for selecting a first button for performing a function of setting the setting information for designating a position where an image is to be inserted into an electronic document and a size of the image to be inserted and identification information regarding the image.

In operation 902, the user interface unit 410 of the host device 100 may generate a frame for designating the setting information.

In operation 903, the user interface unit 410 of the host device 100 may receive the identification information regarding the image to be inserted into the frame generated in operation 902.

In operation 904, the user interface unit 410 of the host device 100 may receive selection information for selecting a second button for performing a function of inserting an image corresponding to the identification information into the electronic document, according to the setting information.

In operation 905, if the selection information for selecting the second button is received in operation 904, the image forming apparatus control unit 440 of the host device 100 controls the image forming apparatus 200 connected to the host device 100 to perform a scanning operation.

In operation 906, the communication interface unit 430 of the host device 100 receives scan data, according to a result of the scanning operation from the image forming apparatus 200.

In operation 907, according to a result of analysis of the scan data, if an image included in the scan data corresponds to the identification information, the processor 420 of the host device 100 may insert the image corresponding to the identification information into the electronic document according to the setting information.

Thus, a user may insert an image into an electronic document only by performing simple manipulation for selecting the first and second buttons.

Figure 10:
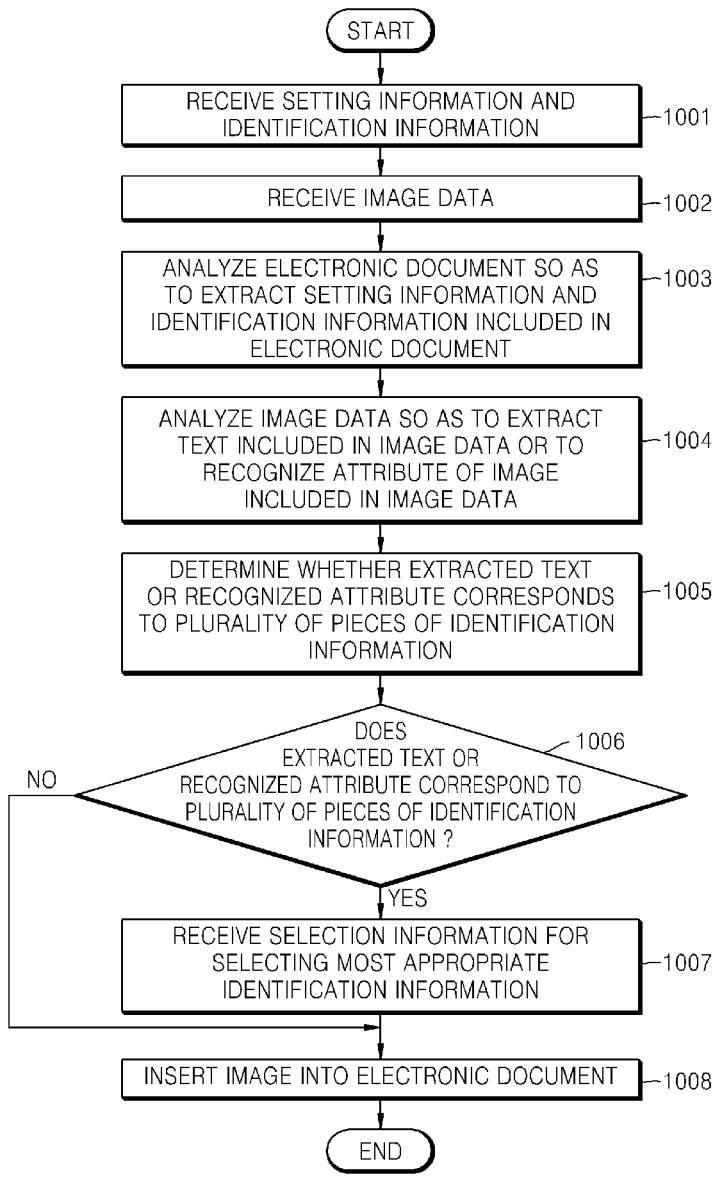
FIG. 10 is a flowchart of a method of inserting an image into at least one electronic document in an image inserting apparatus, according to an example embodiment.

FIG. 10 is a flowchart of a method of inserting an image into at least one electronic document in the image inserting apparatus 400, according to an example embodiment of the present disclosure.

In operation 1001, the user interface unit 410 may receive setting information for designating a position where an image is to be inserted into at least one electronic document and a size of the image to be inserted and identification information regarding the image. In this regard, the received setting information and identification information are stored in the memory 415.

For example, first setting information and first identification information received in order to insert a first image into a first electronic document, second setting information and second identification information received in order to insert a second image into a second electronic document, and third setting information and third identification information received in order to insert a third image into the second electronic document may be stored in the memory 415. In this regard, the first electronic document may be an electronic document, which is being executed in the host device 100, and the second electronic document may be an electronic document, which is stored in the host device 100.

In operation 1002, the communication interface unit 430 may receive image data. For example, the image data may be any one of scan data and facsimile data.

In operation 1003, the electronic document analyzing unit 4211 analyzes a plurality of electronic documents which are being executed or stored in the host device 100, so as to extract the setting information and the identification information included in each electronic document. For example, the electronic document analyzing unit 4211 extracts the first setting information and the first identification information regarding the first electronic document and the second setting information, the second identification information, the third setting information, and the third identification information regarding the second electronic document.

In operation 1004, the image data analyzing unit 4212 may analyze the image data received in operation 1002 so as to extract a text included in image data or to recognize an attribute of an image included in the image data.

In operation 1005, the determination unit 422 may determine whether the text extracted or the attribute recognized in operation 1004 corresponds to a plurality of pieces of the identification information extracted in operation 1003. For example, the determination unit 422 may determine whether the text extracted or the attribute recognized in operation 1004 corresponds to the first identification information, the second identification information, and the third identification information.

In operation 1006, the determination unit 422 may determine whether the plurality of pieces of identification information correspond to the extracted text or the recognized attribute. According to a result of the determination, if it is determined that the plurality of pieces of identification information correspond to the extracted text or the recognized attribute, the method proceeds to operation 1007, or if it is determined that one identification information corresponds to the extracted text or the recognized attribute, the method proceeds to operation 1008.

In operation 1007, the user interface unit 410 may provide a plurality of pieces of identification information to a user to receive selection information for selecting the most appropriate identification information from the user. In this regard, the user interface unit 410 may provide the plurality of pieces of identification information in the form of a graphic user interface (GUI) to the user.

For example, when it is determined that first identification information and the second identification information correspond to the extracted text or the recognized attribute, the user interface unit 410 provides the first identification information and the second identification information to the user.

In operation 1008, the conversion unit 423 and the insertion unit 424 insert the image included in the image data into the electronic document in correspondence to the identification information selected in operation 1007. In this case, an operation of inserting the image in correspondence to the identification information may refer to an operation of converting the image into a size according to the setting information corresponding to the identification information to insert the image into a position according to the setting information corresponding to the identification information. In this regard, the identification information may be the identification information determined in operation 1005 or the identification information selected in operation 1007.

For example, when the first identification information is selected in operation 1007, the conversion unit 423 and the insertion unit 424 may convert the image into a size, according to the setting information, with reference to the setting information corresponding to the first identification information to insert the image into a position, according to the setting information.

Thus, when there are a plurality of pieces of the identification information included in at least one electronic document, the image inserting apparatus 400, according to the current embodiment may insert the image in correspondence to the most appropriate identification information from among the plurality of pieces of identification information.

Figure 11:
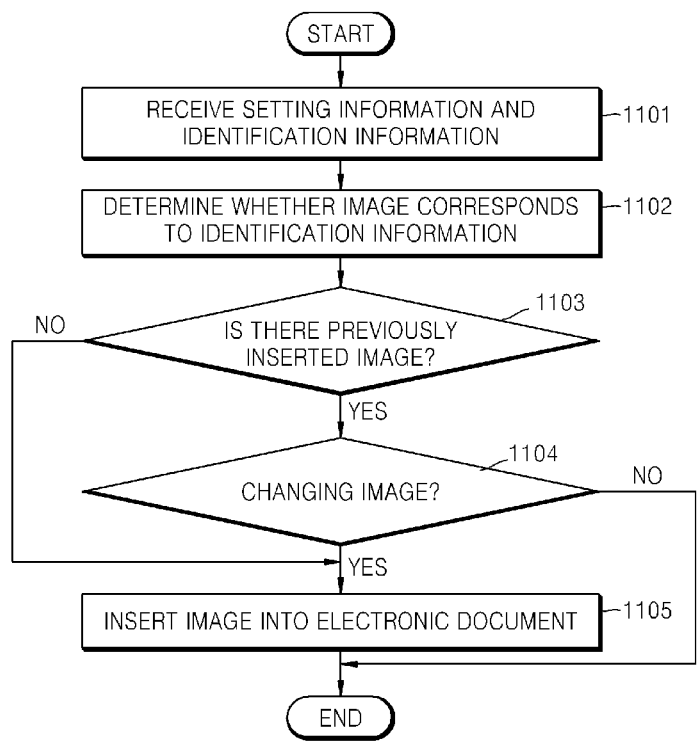
FIG. 11 is a flowchart of a method of changing an image, which is previously inserted into an electronic document, in an image inserting apparatus, according to an example embodiment.

FIG. 11 is a flowchart of a method of changing an image, which is previously inserted into an electronic document, in the image inserting apparatus 400, according to an example embodiment of the present disclosure.

In operation 1101, the user interface unit 410 may receive setting information for designating a position where an image is to be inserted into at least one electronic document and a size of the image to be inserted and identification information regarding the image.

In operation 1102, the determination unit 422 may determine whether an image included in image data corresponds to identification information by analyzing the image data.

In operation 1103, the determination unit 422 may determine whether there is an image which is previously inserted in correspondence to the identification information. According to a result of the determination, if it is determined that there is the previously inserted image, the method proceeds to operation 1104, or if it is determined that there is no previously inserted image, the method proceeds to operation 1105.

In operation 1104, the user interface unit 410 receives selection information for selecting whether to change the previously inserted image. In this regard, the user interface unit 410 may provide the previously inserted image and the image included in the image data to the user so as to allow the user to select whether to change the previously inserted image.

According to a result of the receiving of the selection information, when the previously inserted image is changed, the method proceeds to operation 1105, or when the previously inserted image is not changed, the method ends.

In operation 1105, the conversion unit 423 and the insertion unit 424 may convert the image included in the image data into a size, according to the setting information to insert the image into the electronic document of a position, according to the identification information. In this regard, the previously inserted image may be deleted from the electronic document.

Thus, when the electronic document includes the previously inserted image, the user may change the image into a new image to update the image or may maintain the previously inserted image, thereby improving user convenience.

Figure 12:
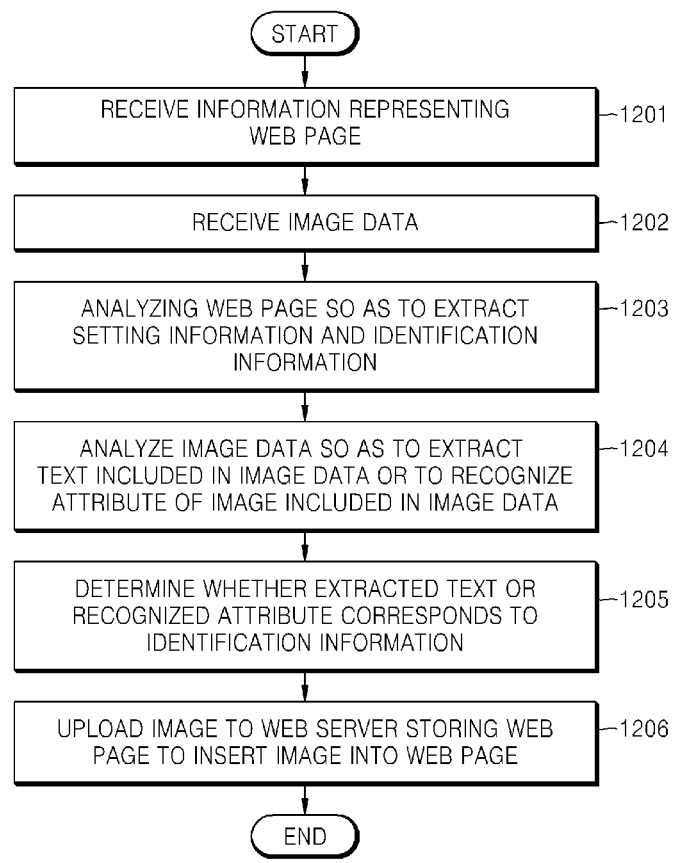
FIG. 12 is a flowchart of a method of inserting an image into an HTML-based web page by an image inserting apparatus, according to an example embodiment.

FIG. 12 is a flowchart of a method of inserting an image into an HTML-based web page by an image inserting apparatus 400, according to an example embodiment of the present disclosure.

In operation 1201, the user interface unit 410 may receive information representing a web page into which an image is to be inserted. For example, the information representing a web page may be a user's identification (ID), a user's password, and a file path of a web server, and the like.

In operation 1202, the communication interface unit 430 may receive image data. For example, the image data may be any one of scan data and facsimile data.

In operation 1203, the electronic document analyzing unit 4211 may analyze a web page corresponding to the information received in operation 1201 so as to extract setting information and identification information.

For example, the electronic document analyzing unit 4211 may extract a text described in alt from among attributes values of an <img> tag or metadata of a <meta> tag in the web page.

In operation 1204, the image data analyzing unit 4212 may analyze the image data received in operation 1002 so as to extract a text included in the image data or recognize an attribute of an image included in the image data.

In operation 1205, the determination unit 422 may determine whether the text extracted or the attribute recognized in operation 1204 corresponds to the identification information extracted in operation 1203.

In operation 1206, the conversion unit 423 and the insertion unit 424 may convert the image included in the image data into a size according to the setting information and upload the converted image to a web server storing a web page in order to insert the converted image into the web page of a position according to the identification information. In other words, the insertion unit 424 may insert the converted image into the electronics document by uploading the converted image to a web server storing the web page.

In this regard, when there is an image that is previously inserted in correspondence to the identification information, operations 1103 and 1104 of FIG. 11 may also be used in the method of inserting an image into an HTML-based web page of FIG. 12. For example, the insertion unit 424 may update a URL image having a "src" attribute of a web page to the image included in the image data.

Thus, a user may easily insert a plurality of images included in a web page from image data. In addition, when the images included in the web page need to be updated, the images may be easily updated by using the method described with reference to FIGS. 11 and 12.

Thus, in a manual web page or a trouble shooting web page provided via a web in a company, when an image included in the web page needs to be changed, a manager may easily upload the image to the web page by using identification information that is previously designated without inconvenience that the user should find a position of the web page and directly change the image connected to the web page.

Further, when uploading of a plurality of images is necessary, for example, in a preview in an Internet bookstore, the plurality of images may be easily uploaded to a web page by using identification information that is previously designated without performing an additional editing operation.

Figure 13:
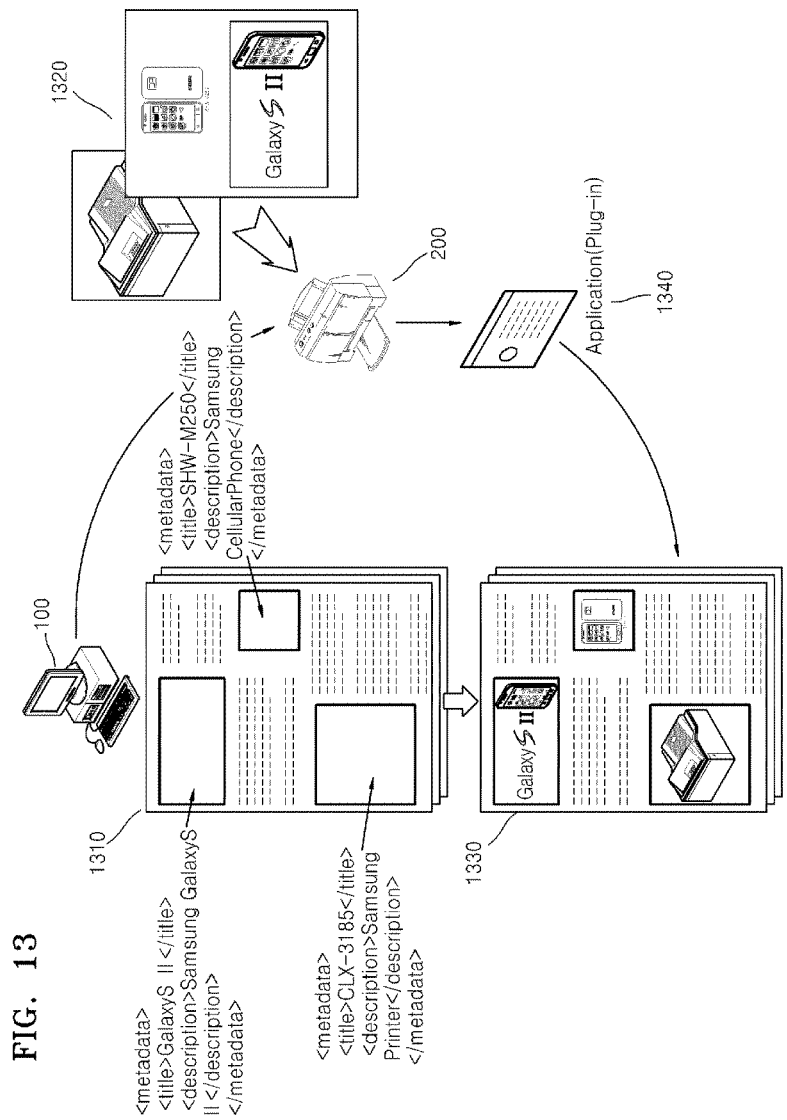
FIG. 13 is an illustration for describing a method of inserting an image into an electronic document by using a host device and an image forming apparatus, according to an example embodiment.

FIG. 13 is a view for describing a method of inserting an image into an electronic document by using the host device 100 and the image forming apparatus 200, according to an example embodiment of the present disclosure.

Referring to FIGS. 6 to 13, the host device 100 may store an electronic document 1310 including setting information and identification information, and the image forming apparatus 200 may generate image data 1320 by performing a scanning operation under the control of the host device 100.

The host device 100 may receive the image data 1320 from the image forming apparatus 200 to insert an image corresponding to the identification information stored in the electronic document 1310 into a position according to the setting information. Thus, the host device 100 stores an electronic document 1330 into which the image is inserted.

In this regard, an operation of inserting the image included in the image data 1320 into the electronic document 1310 may be performed by the image inserting apparatus 400 included in the host device 100, and the image inserting apparatus 400 may be configured in the form of a plug-in 1340 in the host device 100.

Figure 14:
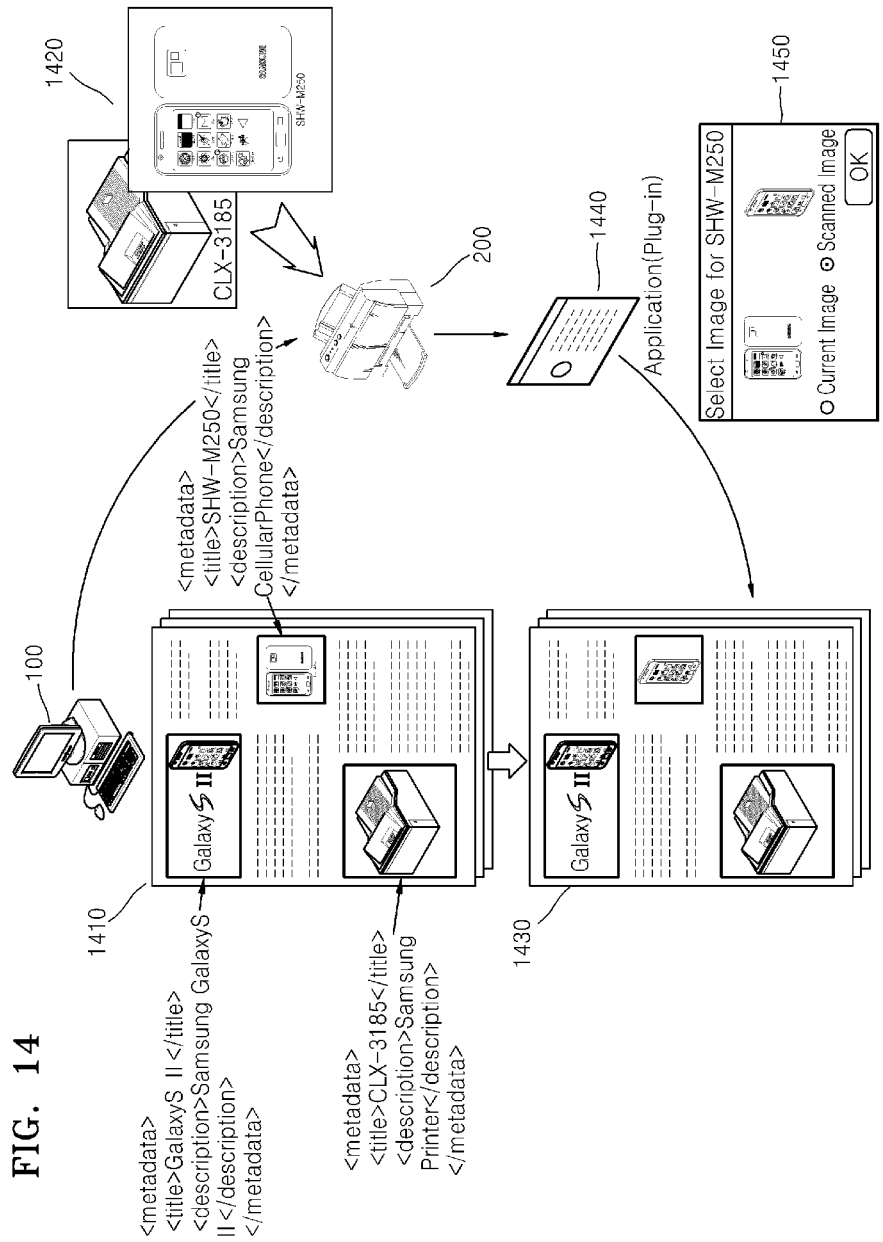
FIG. 14 is an illustration for describing a method of changing an image, which is previously inserted into an electronic document, by using a host device and an image forming apparatus, according to an example embodiment.

FIG. 14 is a view for describing a method of changing an image, which is previously inserted into an electronic document, by using the host device 100 and the image forming apparatus 200, according to an example embodiment of the present disclosure.

Referring to FIGS. 6 to 14, the host device 100 may store an electronic document 1410 including setting information and identification information, and the image forming apparatus 200 may generate image data 1420 by performing a scanning operation under the control of the host device 100. However, the electronic document 1410 may include the previously inserted image.

The host device 100 receives the image data 1420 from the image forming apparatus 200 to insert an image corresponding to the identification information stored in the electronic document 1410 into a position, according to the setting information.

In this regard, when the electronic document 1410 includes the previously inserted image, the image inserting apparatus 400 is configured in the form of a plug-in 1440 in the host device 100 so as to allow a user to select any one image of a previously inserted image and an image included in image data.

The user interface unit 410 may receive selection information for selecting any one image of the previously inserted image and the image included in the image data by using a GUI 1450.

Thus, the electronic document 1430 may maintain the previously inserted image or may be updated into a new image included in image data.

Figure 15:
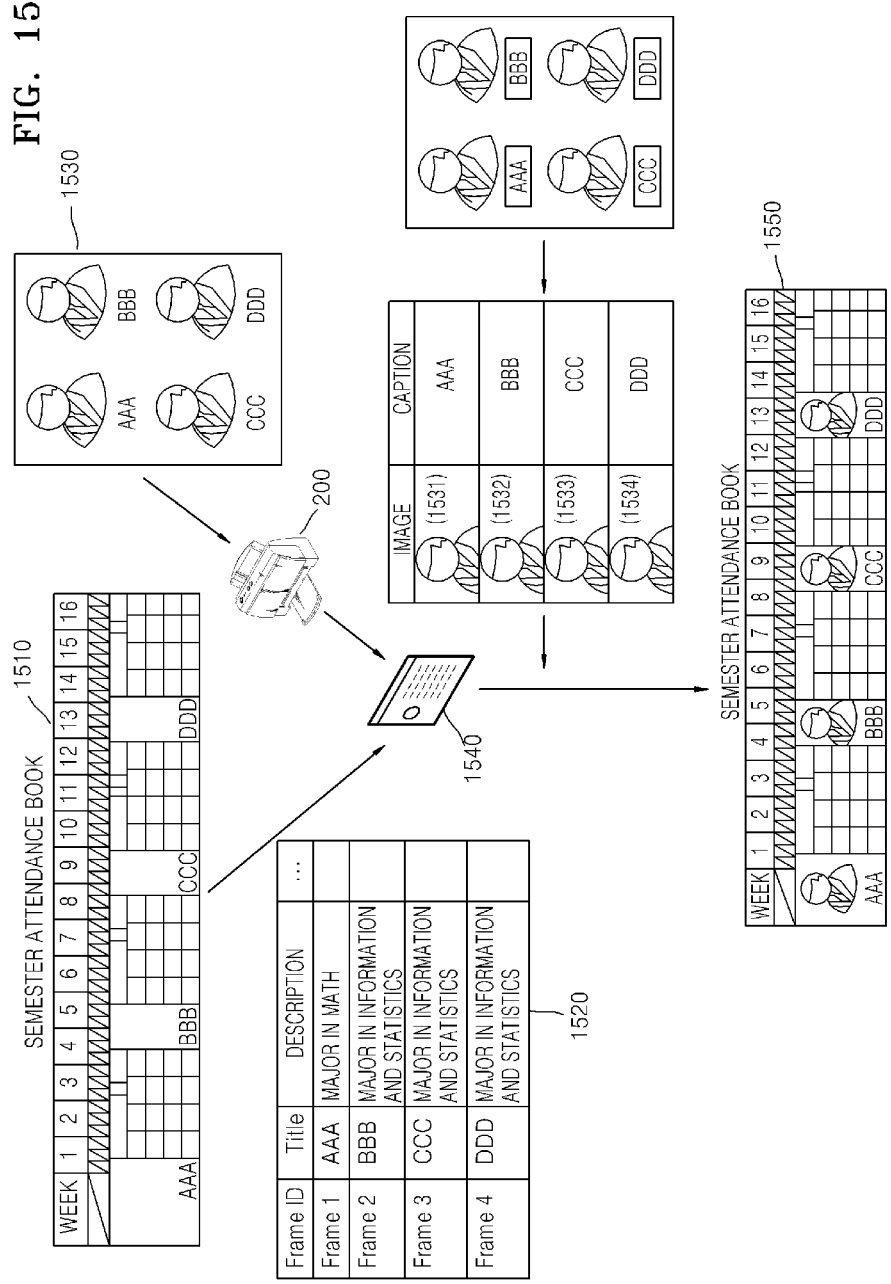
FIG. 15 is an illustration for describing a method of inserting an image into an electronic document, according to an example embodiment.

FIG. 15 is a view for describing a method of inserting an image into an electronic document, according to an example embodiment of the present disclosure. Referring to FIG. 15, the method of inserting an image into an electronic document may be implemented in the form of a plug-in 1540 to be performed in the host device 100, but the present disclosure is not limited thereto.

Referring to FIGS. 3, 6, and 15, the electronic document analyzing unit 4211 of the host device 100 analyzes an electronic document 1510 so as to extract setting information and identification information. For example, when the electronic document 1510 is an attendance book, the setting information and the identification information extracted by the electronic document analyzing unit 4211 may be stored in the memory 415 in the form of database, such as, a table 1520, for example.

The image forming apparatus 200 may generate image data 1530. The communication interface unit 430 of the host device 100 may receive the image data 1530, and the image data analyzing unit 4212 may analyze the image data 1530 so as to extract a first image 1531, a second image 1532, a third image 1533, a fourth image 1534, and texts for the first to fourth images 1531 to 1534. Further, the determination unit 422 of the host device 100 determines whether each of the texts extracted for the first to fourth images 1531 to 1534 corresponds to identification information. According to a result of the determination of the determination unit 422, the conversion unit 423 may convert a size of an image corresponding to the identification information into a size according to setting information, and the insertion unit 424 inserts the converted image into the electronic document 1510, thereby generating the electronic document 1510 into which the image is inserted.

When an attendance book, a student list, or the like, is managed as an electronic document, the image data 1530 is generated by scanning identification pictures, e.g. yearbook photos, and names below the identification pictures, and the generated image data 1530 may be used to automatically register each photo in a position of each student's photo in the attendance book or the student list and to update the existing students' photos.

Figure 16:
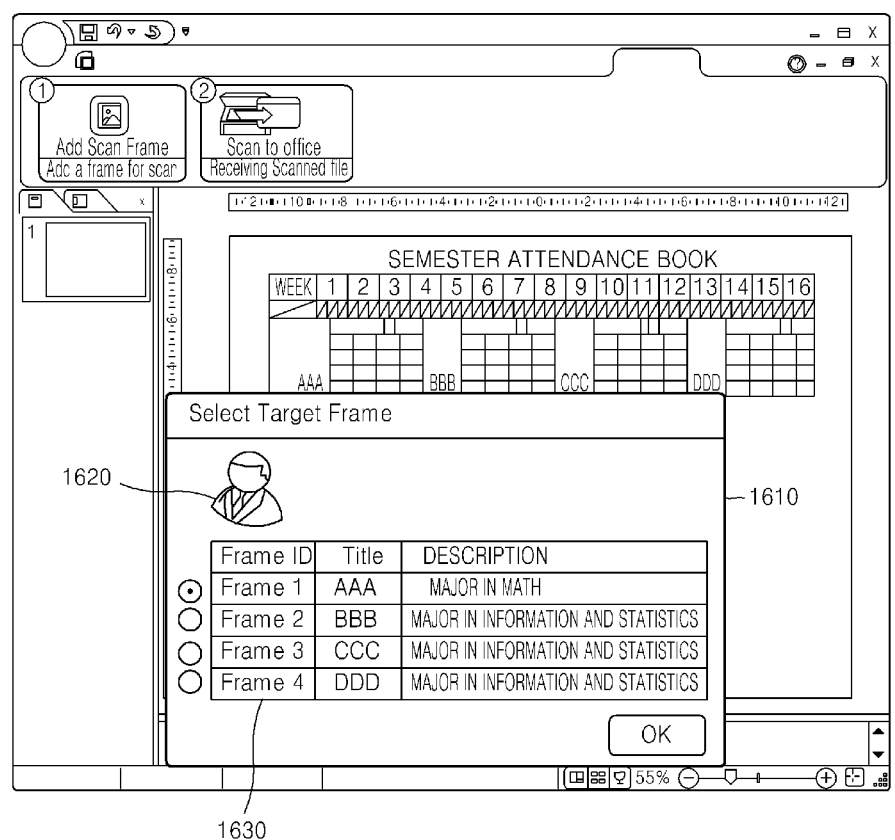
FIG. 16 is an illustration for describing a method of inserting an image into an electronic document, according to another example embodiment.

FIG. 16 is an illustration for describing a method of inserting an image into an electronic document, according to another example embodiment of the present disclosure.

Referring to FIGS. 3, 6, and 15, the determination unit 422 may determine whether an image included in image data corresponds to identification information by using a result of analysis of the image data. In this regard, as a result of the determination, when an image 1620 not corresponding to the identification information exists from among the images included in the image data, the user interface unit 410 may receive selection information for selecting the most appropriate setting information and identification information from a user.

For example, the user interface unit 410 may provide the image 1620 not corresponding to the identification information and a plurality of pieces of setting information and identification information 1630 extracted from an electronic document by using a GUI 1610, and may receive the selection information for selecting the most appropriate setting information and identification information from the user. In this regard, the user may select a case where the image 1620 not corresponding to the identification information is not inserted into the electronic document.

Thus, the conversion unit 423 may convert a size of the image 1620 not corresponding to the identification information into a size, according to the selected setting information, and the insertion unit 424 may insert the converted image into a position according to the selected setting information of the electronic document, according to the selected identification information.

Thus, according to the method of inserting an image into an electronic document, when a user inserts an image included in image data into an electronic document, even though the image does not completely correspond to identification information, the user may easily insert the image into the electronic document.

As described above, a user may easily insert an image into an electronic document by using the method of inserting an image into an electronic document and the image inserting apparatus 400.

For example, when a scanned image is inserted into an electronic document, the image may be inserted into the electronic document by automatically processing image data without performing storing and editing operations on scan data, thereby improving user convenience.

According to the above, a user may easily insert an image into an electronic document through simple manipulation and may change an image that is previously inserted into the electronic document, thereby improving user convenience.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.).

Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the image inserting apparatus may include at least one processor to execute at least one of the above-described units and methods.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A method of inserting an image into an electronic document, the method comprising:
   by at least one hardware processor:
   performing at least one process selected from:
      extracting a text as an image format included in image data, the extracted text being within a predetermined distance from the image included in the image data, and
      recognizing at least one attribute of the image as the image format included in the image data;
   receiving identification information and setting information of specifying a position in the electronic document where the image is to be inserted;
   determining whether the identification information matches the image in response to matching of at least one of the identification information to at least one information selected from the extracted text being within the predetermined distance from the image and the recognized at least one attribute of the image; and
   in response to the determining that the identification information matches the image, inserting the image into the electronic document, according to the setting information.

2. The method of claim 1, wherein the identification information is defined in a metadata format or in a predetermined data format.

3. The method of claim 1, further comprising:
   receiving the electronic document with, in addition to the identification information and the setting information, additional setting information for specifying a size of the image to be inserted into the electronic document; and
   converting, in response to the determining that the identification information matches the image, a size of the image matching the identification information into the size according to the additional setting information,
   wherein the inserting the image comprises inserting the converted image into the electronic document according to the additional setting information in addition to the setting information.

4. The method of claim 1, further comprising:
   extracting the setting information and the identification information included in the electronic document by analyzing the electronic document.

5. The method of claim 1, wherein the electronic document includes at least one document selected from:
   an electronic document being executed, and
   a stored electronic document.

6. The method of claim 1, further comprising:
when the image included in the image data corresponds to a plurality of pieces of the identification information, providing the plurality of pieces of the identification information to a user;
receiving selection information for selecting information from among the plurality of pieces of the identification information; and
determining whether the selected information matches the image in response to matching of at least one of the selected identification information to the at least one information selected from the extracted text being within the predetermined distance from the image and the recognized at least one attribute of the image.

7. The method of claim 1, further comprising:
in response to an image that is previously inserted into the electronic document matching the identification information, providing the previously inserted image and the image included in the image data to a user; and
receiving selection information for selecting whether to change the previously inserted image to the image included in the image data.

8. The method of claim 1, wherein the electronic document comprises a web page, and the inserting the image comprising inserting the image into the electronic document by uploading the image to a web server storing the web page.

9. The method of claim 1, further comprising:
in response to the determining other than that the identification information matches the image included in the image data, providing the image included in the image data, the setting information and the identification information to a user;
in response to receiving updated setting information and updated identification information by the user, determining that the updated identification information matches the image in response to matching of at least one of the updated identification information to the at least one information selected from the extracted text being within the predetermined distance from the image and the recognized at least one attribute of the image; and
in response to the determining that the updated identification information matches the image, inserting the image matching the updated identification information into the electronic document, according to the updated selection information.

10. The method of claim 1, wherein the received identification information includes information representing a name of the image to be inserted.

11. A method of inserting an image into an electronic document in a host device using an image forming apparatus including a scanner, the method comprising:
by at least one hardware processor:
receiving the electronic document;
receiving identification information and first selection information for performing a function of setting up setting information, which specifies a position where the image is to be inserted into the electronic document and a size of the image to be inserted;
assigning the set up setting information to the electronic document;
generating a frame for the electronic document according to the set up setting information;
receiving second selection information for performing a function of inserting the image matching the received identification information into the electronic document according to the assigned setting information; and
in response to the receiving the second selection information, scanning a document including the image to generate image data using the scanner of the image forming apparatus;
performing at least one process selected from:
extracting a text as an image format included in the generated image data, the extracted text being within a predetermined distance from the image included in the generated image data, and
recognizing at least one attribute of the image as the image format included in the generated image data,
determining whether the received identification information matches the image in response to matching of at least on of the identification information to at least one information selected from the extracted text being within the predetermined distance from the image and the reconized at least one attribute of the image; and
in response to the determining that the received identification information matches the image, inserting the image into the generated frame in the electronic document according to the assigned setting information.

12. The method of claim 11, wherein, in response to an image that is previously inserted into the electronic document matching the identification information, providing the previously inserted image and the image included in the image data to a user; and
receiving selection information for selecting whether to change the previously inserted image to the image included in the image data.

13. A non-transitory computer readable recording medium having embodied thereon a computer program for executing the method of claim 1.

14. A non-transitory computer readable recording medium having embodied thereon a computer program for executing the method of claim 11.

15. An image inserting apparatus for inserting an image included in image data into an electronic document, the image inserting apparatus comprising:
a user interface to receive setting information for specifying a position in the electronic document where the image is to be inserted into the electronic document and identification information regarding the image; and
at least one hardware processor to execute:
performing at least one process selected from:
extracting a text as an image format included in the image data, the extracted text being within a predetermined distance from the image included in the image data, and
recognizing at least one attribute of the image as the image format included in the image data;
determining whether the received identification information matches the image in response to matching of at least one of the received identification information to at least one information selected from the extracted text being within the predetermined distance from the image and the recognized at least one attribute of the image; and
in response to the determining that the received identification information matches the image, inserting the image the electronic document, according to the setting information.

16. The image inserting apparatus of claim 15, wherein the received identification information is defined in a metadata format or in a predetermined data format.

17. The image inserting apparatus of claim 15, wherein:
a user interface is further to receive a size according to the received setting information; and
the at least one hardware processor is further to execute converting the image matching the received identification information into the received size according to the received setting information.

18. The image inserting apparatus of claim 15, wherein the at least one hardware processor is further to execute:
extracting the setting information and the identification information included in the electronic document by analyzing the electronic document.

19. The image inserting apparatus of claim 18, wherein the electronic document includes at least one document selected from:
an electronic document being executed, and
a stored electronic document.

20. The image inserting apparatus of claim 15, in response to an image that is previously inserted into the electronic document matching the received identification information, providing the previously inserted image and the image included in the image data to a user; and
receiving selection information for selecting whether to change the previously inserted image to the image included in the image data.

\* \* \* \* \*